United States Patent [19]

Minderhoud et al.

[11] Patent Number: 4,960,505

[45] Date of Patent: Oct. 2, 1990

[54] PROCESS FOR THE HYDROGENATION OF HYDROCARBON OILS

[75] Inventors: Johannes K. Minderhoud, Amsterdam, Netherlands; Jacques Lucien, Grand-Couronne, France

[73] Assignee: Shell Oil Company, Houston, Tex.

[21] Appl. No.: 231,282

[22] Filed: Aug. 12, 1988

[30] Foreign Application Priority Data

Aug. 14, 1987 [FR] France .................. 8711591

[51] Int. Cl.$^5$ ............................. C10G 47/20
[52] U.S. Cl. ..................... 208/143; 208/85; 208/89; 208/108; 208/112; 208/111
[58] Field of Search ............ 208/89, 185, 111, 112, 208/108, 143

[56] References Cited

U.S. PATENT DOCUMENTS

| | | | |
|---|---|---|---|
| 3,943,053 | 3/1976 | Kovach | 208/143 |
| 4,377,468 | 3/1983 | La Pierre | 208/111 |
| 4,401,556 | 8/1983 | Bezman et al. | 208/111 |
| 4,429,053 | 1/1984 | Ward | 208/111 |
| 4,547,285 | 10/1985 | Miller | 208/89 |
| 4,565,137 | 8/1987 | Clark | 208/89 |
| 4,565,621 | 4/1986 | Ward | 585/739 |

FOREIGN PATENT DOCUMENTS

| | | |
|---|---|---|
| 14376 | 4/1983 | Australia . |
| 2014970 | 9/1979 | United Kingdom . |

Primary Examiner—Helane Myers

[57] ABSTRACT

Process for the hydrogenation of hydrocarbon oils by contacting a hydrocarbon oil containing hydrogenatable components and having a boiling range between 130° C. and 520° C. with hydrogen under conditions causing substantial hydrogenation using a catalyst comprising one or more Group VIII noble metal(s) on a support wherein the support comprises a modified Y-type zeolite having a unit cell size between 24.20 and 2430 Å and a $SiO_2/Al_2O_3$ molar ratio of at least 25 and recovering a product containing at least a fraction having a boiling point range between the 90%w boiling point of the feedstock and the final boiling point of the feedstock and which fraction contains on a weight basis at least 50% of the material present in the boiling point range between the 90%w boiling point of the feedstock and the final boiling point of the feedstock.

24 Claims, No Drawings

PROCESS FOR THE HYDROGENATION OF HYDROCARBON OILS

FIELD OF THE INVENTION

The present invention relates to a process for the hydrogenation of hydrocarbon oils using as catalyst Group VIII noble metals supported on a modified Y-type zeolite.

BACKGROUND OF THE INVENTION

It is well known that various hydrocarbon oils have to be upgraded before they meet the particular specification set for them. Usually, hydrocarbon oils obtained by various (hydro)processes need to be upgraded to remove undesired materials which were either present in the starting material(s) or have been introduced during one or more steps of the treatment leading to the desired products.

One of the upgrading processes often applied in hydrocarbon oil processing comprises hydrogenation, often referred to as hydrofinishing. A well known hydrogenation catalyst capable of removing substantially unsaturated moieties such as olefinic compounds and in particular aromatic compounds by converting them into the corresponding saturated compounds comprises a noble metal catalyst on an amorphous carrier, such as platinum on silica-alumina. Although such catalysts show a very good performance as regards hydrogenation activity, they are rather sensitive to the presence of sulphur and/or nitrogen compounds in the feedstock to be treated. In commercial operation preferably hydrotreated feedstocks are used which have sufficiently low sulphur and nitrogen levels to allow an acceptable catalyst life time.

It is known from U.S. Pat. No. 3,943,053 to use a hydrogenation catalyst containing both platinum and palladium in a specific molar ratio, preferably using an alumina carrier. It is emphasized in said patent specification that the use of silica-alumina carriers easily leads to different and undesired reactions thus substantially reducing the yield of the desired product. The advantage of the use of both platinum and palladium resides in an increased sulphur and nitrogen resistance. It also appears necessary to use simultaneous impregnation of the carrier with both platinum and palladium salts in the same acidic solution. Subsequent impregnation of either metal salt is reported not to yield suitable catalyst.

It should be noted that zeolitic materials having high $SiO_2/Al_2O_3$ structural ratios are known to be active hydrocracking catalysts. Reference is made in this respect to EP-B No. 98040 wherein hydrocracking catalysts are described based on highly siliceous forms of certain large pore zeolites (Y,ZSM-20 and beta) comprising typically Ni, W, rare earth metals and Mg as active metal components. It is stated in said patent specification that a preliminary hydrotreating step to remove sulphur and nitrogen and to saturate aromatics to naphthenes will usually improve (hydrocracking) catalyst performance. The use of a Group VIII metal on ZSM-20 as hydrocracking catalyst is also described in U.S. Pat. No. 4,377,468.

It has now been found that the use of certain noble metal(s)-containing zeolitic materials allows very good hydrogenation of feedstocks containing in particular aromatic unsaturation. By the proper choice of zeolitic material and using platinum and in particular platinum and palladium as noble metal(s) a very high hydrogenation yield can be obtained without being affected under operating conditions by substantial hydrocracking.

SUMMARY OF THE INVENTION

The present invention relates to a process for the hydrogenation of hydrocarbon oils by contacting a hydrocarbon oil containing hydrogenatable components and having a boiling range between 130° C. and 520° C. with hydrogen under conditions causing substantial hydrogenation using a catalyst comprising one or more Group VIII noble metal(s) on a support wherein the support comprises a modified Y-type zeolite having a unit cell size between 24.20 and 24.30 Å and a $SiO_2/Al_2O_3$ molar ratio of at least 25 and recovering a product containing at least a fraction having a boiling point range between the 90% w boiling point of the feedstock and the final boiling point of the feedstock and which fraction contains on a weight basis at least 50% of the material present in the boiling point range between the 90% w boiling point of the feedstock and the final boiling point of the feedstock.

It is highly surprising that a very good hydrogenation process without substantially reducing the number of carbon atoms in the heavier parts of the feedstock to be processed can be carried out by catalysts based on crystalline aluminosilicates having a rather high $SiO_2/Al_2O_3$ molar ratio.

DESCRIPTION OF THE PREFERRED EMBODIMENTS

The process according to the present invention is suitably carried out using kerosene and/or cycle oils as feedstocks. Kerosenes which can be advantageously applied comprise straight run kerosenes having a boiling range between 130° C. and 275° C. as well as hydrotreated kerosenes. The process according to the present invention is in particular suitable for the hydrogenation of so-called cycle oils, normally obtained from catalytic cracking operations. Light cycle oils, medium cycle oils as well as heavy cycle oils and mixtures of various cycle oils can be processed advantageously using the process according to the present invention.

In particular the process according to the present invention can be carried out for the hydrogenation of light cycle oils, i.e. oils having a boiling range distribution containing a 90% w boiling point of about 370° C. Mixtures of various types of cycle oils can also be used as feeds. Also hydrotreated cycle oils can be used as feedstocks.

It has been found that the process according to the present invention allows the production of materials with improved properties; when kerosenes are hydrogenated the smoke points are improved considerably and when cycle oils are processed the cetane numbers have increased substantially.

The hydrogenation catalysts to be used in the process according to the present invention have to fulfill a number of conditions. In particular, they have to be based on certain modified Y-type zeolites having a unit cell size between 24.20 and 24.30 Å, in particular between 24.22 and 24.28 Å. It should be noted that besides the unit cell size requirements, the modified Y-type materials should also have a $SiO_2/Al_2O_3$ molar ratio of at least 25, in particular above 35 and preferably between 35 and 60.

Without wishing to be bound to any particular theory it is observed that apparently by applying the combination of a rather low unit cell size and a high $SiO_2/Al_2O_3$ molar ratio hydrogenation processes appear to be the dominant processes without substantial hydrocracking taking place, if at all. A measure to indicate the substantial absence of hydrocracking when operating the process according to the present invention can be found by analyzing the higher end of the TBP/GLC pattern of the feedstock and that of the product. When the fraction of the product recovered having a boiling point range between the 90% w boiling point of the feedstock and the final boiling point of the feedstock also contains on a weight basis at least 50% of the material originally present in the boiling range of the feedstock between the 90% w boiling point and the final boiling point, the feedstock has been processed in accordance with the present invention.

Therefore, the composition on a weight basis of the final 10% w of the feedstock together with a conventional analysis of the aromatics content of the total product (e.g. by U.V.- measurements) is considered to be an adequate measure of the hydrogenating activity and selectivity of the catalyst concerned. It has been found that hydrogenation taking place on molecules present in the final 10% w invariably leads to materials boiling below the 90% w boiling point of the feedstock. This may well account for up to 50% of the material no longer boiling within the range between the 90% w boiling point of the feedstock and the final boiling point of the feedstock. In practice, up to 30% of the material referred to hereinbefore will have been hydrogenated. A larger reduction of the weight composition of said fraction is caused by hydrocracking rather than by hydrogenation. It is preferred to carry out the process according to the present invention in such a way that on a weight basis at least 80% w of the fraction of the feedstock having a boiling range between the 90% w boiling point of the feedstock and the final boiling point of the feedstock is preserved.

The zeolitic materials which can be used as starting materials to produce the catalysts to be used in the process according to the present invention comprise readily available Y-type zeolites such as ultra-stable Y and very ultra-stable Y which can be modified by using processes known in the art to produce the base materials having the required unit cell size dimension together with the required $SiO_2/Al_2O_3$ molar ratio. Suitable modification processes comprise ion-exchange techniques followed by one or more calcination stages, optionally in the presence of steam. Normally, Y-zeolites already partially modified are subjected to a so-called dealumination technique to reduce the amount of alumina present in the system. Dealumination techniques are described extensively in the art and comprise inter alia the use of acid extraction, the use of silicon halides or other suitable chemical treating agents, chelates as well as the use of chlorine or chlorine-containing gases at high temperatures. Good results have been obtained using materials which have been subjected to one or more acid-leaching procedures, but other techniques can be applied as well.

It should be noted that both unit cell size and molar silica/alumina ratio have to be within the ranges specified hereinabove since it has been found that not only a specific unit cell size range but also the molar silica-alumina ratio are important to achieve the desired hydrogenation activity of the catalytic material while substantially excluding hydrocracking activity which would affect product yield and properties.

The Group VIII metals to be used in the process according to the present invention comprise ruthenium, rhodium, palladium, osmium, iridium and platinum. Very good results have been obtained with platinum and with combinations of platinum and palladium. The use of catalysts containing both platinum and palladium is preferred since such catalysts allow relatively low hydrogenation temperatures. The noble metals are suitably applied in amounts between 0.05 and 3% w on zeolite base material. Preferably amounts are used in the range between 0.2 and 2% w on zeolite material. When two noble metals are applied the amount of the two metals normally ranges between 0.5 and 3% w on zeolite material. When platinum and palladium are used as the noble metals normally a platinum/palladium molar ratio of 0.25–0.75 is applied.

The catalysts to be used in the process according to the invention are suitably prepared by incorporating the desired amount of noble metal(s) into the appropriate zeolite, optionally together with a binder, by means of impregnation or ion-exchange techniques followed by drying, calcining and a reduction treatment, suitably with hydrogen-containing gas(es) to produce the noble metal(s) in the desired state. Suitable methods comprise impregnation of the appropriate zeolite/binder material with an aqueous solution of a palladium(II) halide, preferably palladium(II)chloride or palladium nitrate or the appropriate ammine-complex. Suitable platinum compounds to be used comprise hexahaloplatinic acid, in particular hexachloroplatinic acid-optionally in the presence of hydrochloric acid-, platinum amine hydroxide and the appropriate platinum amine complexes.

Normally, alumina and silica can be used as binder material, preference being given to the use of alumina.

Depending on the sulphur and nitrogen levels of the feedstock(s) to be treated it may be advantageous to subject the feedstocks to one or more pre-treatments to reduce the levels of sulphur and nitrogen accordingly. Although the catalysts to be used in the present process are much more sulphur and nitrogen resistant than the catalysts referred to hereinbefore it will be clear that best results will be obtained using feedstocks containing rather limited amount of sulphur and nitrogen. It has been found that feedstocks containing up to 1000 parts per million by weight of sulphur and up to 50 parts per million by weight of nitrogen can be processed adequately. It will be appreciated that both sulphur and nitrogen present in the pre-treated feedstocks will be converted substantially under the prevailing hydrogenation conditions since they are present in rather minute concentrations, the major process being the hydrogenation of the remaining aromatic compounds present in the feedstocks.

The pre-treatment which can be applied in the process according to the invention normally comprises a hydrotreatment. Hydrotreating processes are well known in the art. Normally Group VI and/or Group VIII metal compounds on an amorphous carrier such as alumina or silica-alumina can be suitably applied. Examples of such metals comprise nickel, cobalt and molybdenum. The catalysts are preferably in sulphided form. Temperatures between 200° C. and 375° C. can be suitably applied. Pressures normally range between 40 and 100 bar depending on the type of catalyst applied.

The hydrogenation process according to the present invention is normally carried out at a temperature between 150° C. and 350° C., in particular between 200° C. and 325° C. and preferably between 225° C. and 300° C.

It should be noted that the temperature to be applied is dependent on the nature of the feedstock to be hydrogenated. Normally a temperature will be chosen which allows a substantial hydrogenation of the hydrogenatable components in the feedstock, say at least 70% of the total amount of components to be hydrogenated. It is preferred to carry out the process under conditions which allow at least 80% conversion by hydrogenation of the hydrogenatable components, amounts above 90% being particularly preferred. By a proper choice of temperature and pressure more than 95% of the hydrogenatable components can be hydrogenated without causing substantial hydrocracking at the same time. It is preferred to carry out the hydrogenation at rather low temperatures which will reduce hydrocracking side reactions in any event. The partial hydrogen pressure to be applied ranges between 20 and 120 bar, in particular between 30 and 100 bar, preferably between 40 and 90 bar. Space velocities between 0.05 and 5 kg/l/h can be applied, preferably between 0.1 and 2 kg/l/h. Hydrogen/feedstock ratios (Nl/kg) between 200 and 2000 can be suitably applied, preferably between 400 and 1500.

The process according to the present invention may be carried out in any suitable equipment, a fixed bed reactor system wherein the feedstock is passed over one or more stationary beds of catalyst is preferred. The reactor effluent is passed to a separation zone where hydrogen-rich gas is separated off and suitably recycled to the reaction zone together with make-up hydrogen is needed.

As hydrogen source use can be made of pure hydrogen or of hydrogen-containing mixtures for instance the gases produced in catalytic reforming processes.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The present invention will now be illustrated by means of the following Examples which are provided for illustrative purposes only and are not to be construed as limiting the invention.

EXAMPLE 1

(a) Preparation of Catalyst

A commercially available ultra-stable Y-zeolite having a unit cell size of 24.35 Å and containing 23% w of alumina ($SiO_2/Al_2O_3$ molar ratio 5.7) was subjected to a treatment with 1.6 N HCl solution at 90° C. for a period of two hours. After washing and drying a material was obtained having a unit cell size of 24.25 Å and containing 3.47% w of alumina ($SiO_2/Al_2O_3$ molar ratio 47). The material thus treated was impregnated with a solution of $H_2PtCl_6$ and $PdCl_4$ made up to allow after reduction with hydrogen at 400° C. a Pt content of 0.3% w on zeolite and a Pd content of 0.5% w on zeolite.

(b) Hydrogenation Experiments

The catalyst as prepared according to Example 1a was tested in the form of crushed pellets. They hydrogenation tests were carried out using a hydrotreated light cycle oil containing 70 ppmw of sulphur and 1.5 ppmw of nitrogen. Its 90% w boiling point was 331° C. (i.e. containing 10% w of material boiling above 331° C.). The total aromatics content of the feedstock amount to 29% w. The tests were carried out at a hydrogen partial pressure of 100 bar, a space velocity of 2 kg/l/h and a hydrogen feed ratio 1000 Nl/kg. The tests were performed at various temperatures in order to establish the hydrogenation pattern of the feedstock.

(c) Results

It was found that at a final hydrogenation temperature of 280° C. the composition of the product was such that 7% w of the product had a boiling point above 331° C. The total aromatics content of the product amounted to 0.8% w, i.e., almost complete hydrogenation of the aromatic components initially present.

When the process was operated at a rather low temperature (about 210° C.) it was found that 8% w of the product had a boiling point above 331° C. while the aromatics content left over was not more than 2% w thus indicating again that almost complete hydrogenation had taken place together with the production of components boiling below 331° C. by hydrogenation.

EXAMPLE 2

The experiment described in Example 1 was repeated using a catalyst which had been obtained by treating the Y-zeolite with a 2.0 N HCl solution under otherwise identical conditions producing thereby a material having a unit cell size of 24.25 Å and containing 2.93% w of alumina ($SiO_2/Al_2O_3$ molar ratio 56). The metals were incorporated in a similar manner. After hydrogenating at 280° C. the amount of material in the product boiling above 331° C. was 8% w. The total aromatics content of the product amounted to 0.5% w. When the experiment was repeated at 300° C., the amount of material in the product boiling above 331° C. was 8% w and the total aromatics content amounted to 0.4% w.

EXAMPLE 3

The experiment described in Example 2 was repeated but using a hydrogen partial pressure of 50 bar. After hydrogenation at 270° C. the amount of material in the product boiling above 331° C. was 7% w. The total aromatics content amounted to 1.2% w.

EXAMPLE 4

The experiment described in Example 1 was repeated using a catalyst containing only platinum in an amount of 0.8% w as hydrogenating metal.

The feedstock to be hydrogenated was a kerosene obtained by atmospheric distillation of a North Sea oil. The total aromatics content of the feedstock amount to 17.2% w. It contained also 310 ppmw of sulphur and 3 ppmw of nitrogen. Its 90% w boiling point was 236° C. (i.e. containing 10% w of material boiling above 236° C.). The hydrogenation conditions were as described in Example 1 but for the hydrogen/feed ratio which amount to 400 in this experiment. It was found that at a hydrogenation temperature of 300° C. the composition of the product was such that 7% w of the product had a boiling point above 236° C. The total aromatics content of the product amounted to 1.0% w.

EXAMPLE 5

The experiment described in Example 1 was repeated but subjecting the starting material this time to a treatment with 1.8 N HCl for a period of 2 hours at 90° C.

After washing and drying a material was obtained having a unit cell size of 24.24 Å and containing 3.22% w of alumina ($SiO_2/Al_2O_3$ molar ratio 51).

The feedstock to be hydrogenated was a hydrotreated light cycle oil containing 25 ppmw of sulphur and 11 ppmw of nitrogen. Its 90% w boiling point was 349° C. (i.e. containing 10% w of material boiling above 349° C.). The total aromatics content of the feedstock amount to 61.6% w.

The tests were carried out at a hydrogen partial pressure of 30 bar, a space velocity of 2 kg/l/h and a hydrogen/feed ratio of 1000 Nl/kg. It was found that at a hydrogenation temperature of 300° C. the composition of the product was such that 6% w of the product had a boiling point above 349° C. The total aromatics content of the product amounted to 8.5% w. It is remarkable that under very mild hydrogenation conditions no less than 86% of the initial aromatics content could be hydrogenated.

COMPARATIVE EXAMPLE

A commercially available ultra-stable Y-zeolite in the NH4+ form having a unit cell size of 24.56 Å and containing 23% w of alumina ($SiO_2/Al_2O_3$ molar ratio 5.7) was subjected to a steam treatment at 800° C. for a period of three hours to produce a material having a unit cell size of 24.28 Å and containing 22.6% w of alumina ($SiO_2/Al_2O_3$ molar ratio 5.8). The same amounts of platinum and palladium as described in Example 1 were incorporated in the zeolite. The hydrogenation experiments were carried out at 100 bar using the feedstock as described in Example 1. After hydrogenation at 280° C. the composition of the product was such that only 2.5% w of the product had a boiling point above 331° C. The total aromatics content was quite acceptable (1.6% w). After hydrogenation at 300° C. no material boiling above 331° C. could be found but the product still contained about 1% w of aromatic components.

EXAMPLE 6

(a) Preparation of Catalyst

A commercially available ultra-stable Y zeolite having a unit call size of 24.35 Å and containing 23% w of alumina ($SiO_2/Al_2O_3$ molar ratio 5.7) was subjected to a treatment with 2.0 N HCl solution at 90° C. for a period of two hours. After washing and drying a material was obtained having a unit cell size of 24.25 Å and having a $SiO_2/Al_2O_3$ molar ratio of 489. This material was mixed with alumina and extruded to give extrudates containing 20% w of alumina. The extrudates obtained were dried at 120° C. for twelve hours and then subjected to a calcination at 550° C. for a period of three hours.

The extrudates thus treated were impregnated with a solution of $Pd(NH_3)_4(NO_3)_2$ and a solution of $Pt(NH_3)_4(OH_2)$ in $HNO_3$ made up to allow after reduction with hydrogen at 400° C. a Pt content of 0.3% w on zeolite and a Pd content of 0.5% w on zeolite. Prior to the treatment with hydrogen the impregnated extrudates had been subjected to drying (twelve hours at 60° C.) and calcining (two hours at 300° C.).

(b) Hydrogenation Experiments

The extrudates prepared as described in Example 6a were tested using a hydrotreated light cycle oil containing 88 ppmw of sulfur and 2.5 ppmw of nitrogen. Its 90% w boiling point was 339° C. (i.e. containing 10% w of material boiling above 339° C.). The total aromatics content amounted to 41.4% w. The tests were carried out at a hydrogen partial pressure of 50 bar, a space velocity of 2 kg/l/h and a hydrogen/feed ratio of 1000 Nl/kg.

(c) Results

After hydrogenation at 270° C. the amount of material in the product boiling above 339° C. amounted to 6.5% w. The total aromatics content of the product amounted to 6.8% w.

We claim:

1. A process for the hydrogenation of hydrocarbon oils by contacting at a temperature between 150° and 350° C. a hydrocarbon oil feedstock containing hydrogenatable components and having a boiling range between 130° C. and 520° C. with hydrogen under conditions wherein at least 70% of the total hydrogenatable components is hydrogenated using a catalyst comprising one or more Group VIII noble metal(s) on a support wherein the support comprises a Y zeolite having a unit cell size between 24.20 and 24.30 Å and a $SiO_2/Al_2O_3$ molar ratio above 35 and recovering a product containing at least 50% by weight of the material present in the feedstock between the 90% w boiling point and the final boiling point of the feedstock.

2. The process according to claim 1 wherein a catalyst is used based on a Y-zeolite having a unit cell size between 24.22 and 24.28 Å.

3. The process according to claim 2 wherein a catalyst is used based on a Y-zeolite having a $SiO_2/Al_2O_3$ molar ratio between 35 and 60.

4. The process according to claim 1 wherein use is made of a catalyst support obtained by dealuminating a Y zeolite.

5. The process according to any one of claims 1–4 wherein use is made of a catalyst containing platinum and/or palladium as noble metal(s).

6. The process according to claim 5 wherein use is made of between 0.05 and 3% w of noble metal(s) on zeolite base.

7. The process according to claim 6 wherein use is made of platinum and palladium in a molar ratio of 0.25 to 0.75.

8. The process according to claim 7 wherein the support additionally comprises an alumina binder.

9. The process according to claim 1 wherein use is made of a catalyst containing platinum and/or palladium as noble metal(s).

10. The process according to claim 9 wherein use is made of between 0.05 and 3% w of noble metal(s) on zeolite base.

11. The process according to claim 10 wherein a catalyst is used based on a Y-zeolite having a unit cell size between 24.22 and 24.28 Å.

12. The process according to claim 10 or 11 wherein a catalyst is used based on a Y-zeolite having a $SiO_2Al_2O_3$ molar ratio between 35 and 60.

13. The process according to claim 12 wherein use is made of a catalyst support obtained by dealuminating a Y zeolite.

14. The process according to claim 1 wherein use is made of a feedstock which has been subjected to a pre-treatment.

15. The process according to claim 14 wherein the pre-treatment comprises a hydrotreatment using a Group VI and/or Group VIII metal compound on an amorphous carrier.

16. The process according to claim 15 wherein the hydrotreatment is carried out in such a way as to reduce the sulphur and nitrogen levels of the feedstock to below 1000 ppmw and 50 ppmw, respectively.

17. The process according to claim 1 wherein the hydrogenation is carried out at a temperature between 200° C. and 325° C.

18. The process according to claim 17 wherein the hydrogenation is carried out at a temperature between 225° C. and 300° C.

19. The process according to claim 1 wherein at least 80% of the total amount of hydrogenatable components is hydrogenated.

20. The process according to claim 19 wherein at least 90% of the total amount of hydrogenatable components is hydrogenated.

21. The process according to claim 1 wherein the hydrogenation is carried out at a hydrogen partial pressure in the range between 20 and 120 bar.

22. The process according to claim 21 wherein the hydrogenation is carried out at a hydrogen partial pressure in the range between 30 and 100 bar.

23. The process according to claim 1 wherein a kerosene feedstock is hydrogenated.

24. The process according to claim 1 wherein a cycle oil is hydrogenated.

* * * * *